Dec. 11, 1951 G. E. INGRAM 2,578,553
THERMOSTATIC AIR CONTROL DEVICE FOR CARBURETORS
Filed Feb. 21, 1949
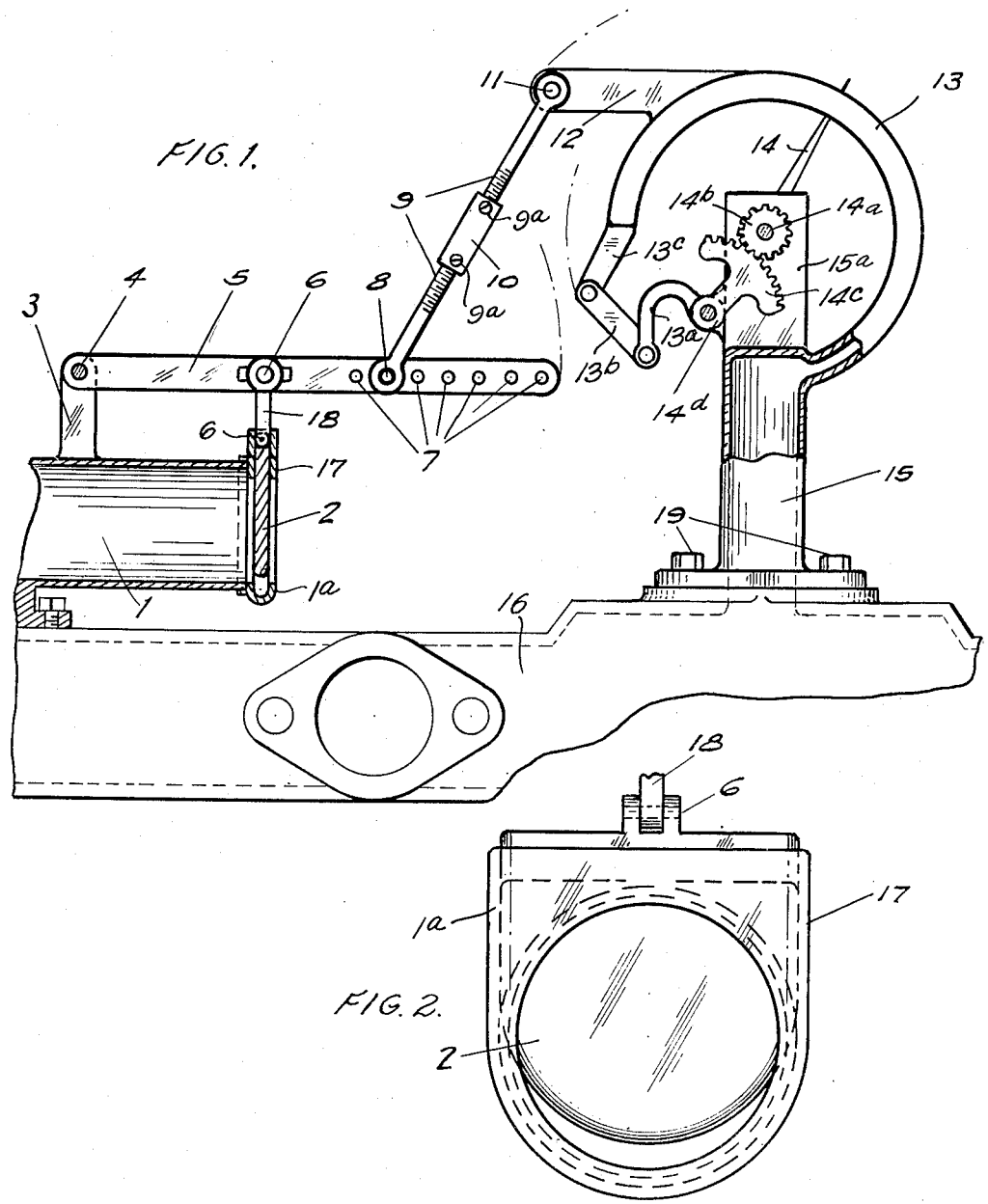
INVENTOR.
George E. Ingram
BY
J. Stanley Burch
Attorney Patented Dec. 11, 1951

2,578,553

UNITED STATES PATENT OFFICE 2,578,553

THERMOSTATIC AIR CONTROL DEVICE FOR CARBURETORS

George E. Ingram, Chicago, Ill.

Application February 21, 1949, Serial No. 77,665

6 Claims. (Cl. 123—119)

My invention relates to a thermostatic air control device for carburetors and an object thereof is to provide a simple and novel device for automatically controlling the volume of air admitted to the air intake of the carburetor to provide a leaner or richer mixture of air and gasoline or other liquid fuel, according to requirements of various fuels, operating elevation or altitude of the motor and the temperature of the motor and the intake manifold of the motor by connection with the motor and temperature effect thereon.

Another object of the invention is to provide an air inlet valve for the carburetor which is controlled by a thermostatic element exposed to the hot gases in the intake manifold of the motor as affected by the running temperature of the latter, depending upon the speed of the motor, the fuel used, the operating elevation, the load and other factors affecting such temperature, whereby when the motor is started and until it warms or heats up, a rich mixture will be supplied to the motor and then when the motor and intake manifold become hot, said expansible element operates by expansion from the heat of the engine and gaseous mixture heated thereby to open the air intake valve of the carburetor wider, thereby increasing the inlet of air in proportion of the gasoline or other liquid fuel to produce a leaner mixture.

A further object of the invention is to provide means for adjusting the position of the air inlet or gate valve of the carburetor in accordance with the requirements of the engine with various fuels and operating elevations as well as other factors, in connection with an expansible element in the form of a tube exposed to the hot gases in the intake manifold of the engine, by means of an adjustable connection between the valve and element whereby the valve can be initially set according to requirements and opened and closed by variations in the temperature of the motor and said gases to decrease the amount of air entering the carburetor and manifold when starting or when the motor is cool and to proportionately increase the air supply as the motor heats up.

With the above and other objects in view, the invention consists in the combinations and arrangements of parts to be hereinafter described and pointed out in detail.

Reference is had to the accompanying drawings forming a part of this application, in which Figure 1 is a somewhat diagrammatic sectional elevation showing the thermostatic air control device for carburetors applied to the air intake valve of the carburetor and the expansible element applied to the intake manifold of a motor connected to the valve.

Figure 2 is an enlarged face view of the air inlet valve of the carburetor.

Referring to the drawings in detail, 1 designates the tubular carburetor casing or air intake of a carburetor, the inlet end having mounted thereon a gate or slide valve 2 operating in its grooved housing or frame 1a extending above the same to permit vertical sliding of the gate therein to regulate the size of the opening and volume of air entering the carburetor to mix with the atomized gasoline or other liquid fuel to be drawn into the intake manifold and subsequently to the cylinders of the motor to be compressed and fired in the usual way. The valve 2 is adapted to be set in a normally open position permitting the intake of the air in such volume required for the normal operation of the engine of an automobile or other vehicle using standard fuel at an elevation or altitude under which such automobiles are operating.

A support bracket 3 is attached to the carburetor casing or intake in an upright position and has pivoted thereon at 4, a lever 5 to which an actuating arm or link 18 pivoted to the top of the gate valve 2 is pivotally connected at 6 through a suitable slot in the lever. Lever 5 projects beyond pivot 6 and is provided with a plurality of spaced holes 7 for adjustable connection pivotally at 8, of the lower end of a lengthwise adjustable rod or link having threaded sections 9 connected by an oppositely threaded nut or turnbuckle 10 with suitable set screws 9a for securing the same in adjusted set position.

The upper end of the rod or link 9 is pivotally connected at 11 to the free end of an extension 12 on an expansible thermostat tube 13 of arcuate or C-shape, as shown. Tube 13 extends out from and communicates interiorly with the upper end of an upright pipe 15 over an opening in an intake manifold of the motor, leading from the carburetor to the various cylinders of the motor through the usual intake valves as is well known. The base flange of the pipe 15 is bolted as at 19 to the intake manifold 16 with an interposed packing or gasket around the intake manifold opening so that the hot gases in the manifold heated from the motor may enter the tube 13 to cause expansion thereof.

A pointer 14 operates over the tube 13 which latter may be suitably calibrated, if desired, and in connection with the adjustment at 7 of rod or link 9 permits opening of the gate valve 2 in accordance with the requirements of the various fuels and operating elevations of the motor. Pointer 14 is mounted on a shaft 14a carrying a pinion 14b in mesh with a toothed segment 14c pivoted at 14d and all carried by a bracket 15a on pipe 15. Segment 14c carries a fixed arm 13a curved outwardly and downwardly to pivotally connect to the lower end of a link 13b in turn pivotally connected at its upper end to the free end of an angular extension 13c on the free end of tube 13.

In the operation of the device as described, when the motor is first started and in cool condition, the supply of air through the valve 2 is such that a rich mixture is provided. However, as the motor is heated up and the gaseous mixture through the intake manifold 16 is heated, this gas at an increased temperature escaping into the tube 13 through the pipe 15, causes the expansion of tube 13 thereby pulling upwardly on the adjustable connector or rod 9 and with it the elevation of the lever 5 to open the valve 2 and increase the volume of air entering the carburetor to produce a thinner or leaner mixture by the increased proportion of the air to the fuel. The expansion of tube 13 tending to straighten it, also pulls upwardly on the link 13b at extension 13c and rocks the toothed or rack segment 14c in mesh with the pinion 14b to move the pointer 14 to indicate that the device is working and the relative proportion of air to gas or fuel in the heated condition of the motor and manifold together with the gaseous mixture in the latter in accordance with the various factors described for the best operation of the motor for various fuels and operating elevations of the motor, the load and other conditions controlling the same.

Having thus described my invention, what I claim is:

1. An automatic temperature responsive choke control for the inlet valve of a carburetor of an internal combustion engine having an inlet manifold comprising a lever fulcrumed upon a fixed support and in operative connection with the carburetor inlet valve, an expansible thermostat element in communication with the engine manifold, a link extending from the thermostat element toward the lever, and means for pivotally interconnecting the link to the lever to transmit movement therethrough to the air inlet valve in response to expansion of the thermostat element.

2. An automatic temperature responsive choke control for the inlet valve of a carburetor of an internal combustion engine having an inlet manifold, comprising a lever fulcrumed at one end upon a fixed support and in operative connection with the carburetor inlet valve, an expansible thermostat element in communication with the engine manifold, a longitudinally adjustable link extending from the thermostat element toward the lever, and means for pivotally interconnecting the link to the lever at any selected one of a plurality of points unequally remote from its fulcrum point to vary the extent of movement transmitted therethrough to the air inlet valve in response to expansion of the thermostat element.

3. An automatic temperature responsive choke control for the inlet valve of a carburetor of an internal combustion engine having an inlet manifold, comprising a lever fulcrumed upon a fixed support and in operative connection with the carburetor inlet valve, an expansible thermostat element in communication with the engine manifold, a link interconnecting the thermostat element and lever for transmitting motion to the air inlet valve in response to expansion of the thermostat element, an indicator movable through a fixed path, and means interconnecting the indicator with the thermostat element for operation thereby through varying distances along its fixed path concurrently with transmission of a commensurate movement through the link to the air inlet valve.

4. An automatic temperature responsive choke control for the inlet valve of a carburetor of an internal combustion engine having an inlet manifold, comprising a lever fulcrumed upon a fixed support and in operative connection with the carburetor inlet valve, an expansible thermostat element in communication with the engine manifold, a longitudinally adjustable link interconnecting the thermostat element and lever for transmitting motion to the air inlet valve in response to expansion of the thermostat element, a pivotally mounted indicator movable through a fixed path, and means interconnecting the indicator with the thermostat element for operation thereby through varying distances along its fixed path concurrently with transmission of a commensurate movement through the link to the air inlet valve.

5. An automatic temperature responsive choke control for the inlet valve of a carburetor of an internal combustion engine having an inlet manifold comprising a lever fulcrumed upon a fixed support and in operative connection with the carburetor inlet valve, an expansible thermostat element in communication with the engine manifold, a link interconnecting the thermostat element and lever for transmitting motion in a predetermined variable amount to the air inlet valve in response to expansion of the thermostate element, an indicator movable through a fixed path, and means interconnecting the indicator with the thermostat element for operation thereby along its fixed path concurrently with transmission of movement through the link to the air inlet valve.

6. An automatic temperature responsive choke control for the inlet valve of a carburetor of an internal combustion engine having an inlet manifold, comprising a lever of the third class fulcrumed upon a fixed support and gravity-operated to a down position, the lever being in operative connection with the carburetor inlet valve for closing it when in down position, an expansible thermostat element in communication with the engine manifold, a link extending from the thermostat element toward the lever, and means for pivotally interconnecting the link to the lever to transmit upward movement therethrough to the air inlet valve in response to expansion of the thermostat element.

GEORGE E. INGRAM.

REFERENCES CITED

The following references are of record in the file of this patent:

UNITED STATES PATENTS

| Number | Name | Date |
|---|---|---|
| 2,245,093 | Meston | June 10, 1941 |
| 2,334,438 | Perrine | Nov. 16, 1943 |